United States Patent Office 3,518,392
Patented June 30, 1970

3,518,392
CERTAIN 2-SPIRO-TETRAHYDRO-HALO-
SULFAMYL-QUINAZOLINONES
Bola Vithal Shetty, Rochester, N.Y., assignor to Pennwalt Corporation, East Orange, N.J., a corporation of Pennsylvania
No Drawing. Continuation-in-part of application Ser. No. 517,995, Jan. 3, 1966. This application Nov. 2, 1967, Ser. No. 680,010
Int. Cl. C07d 51/48
U.S. Cl. 260—256.5    4 Claims

ABSTRACT OF THE DISCLOSURE

A tetrahydro - 6 - sulfamyl-7-haloquinazolinone compound having diuretic properties with low potassium excretion, characterized by having a phenyl, or phenylalkyl group, which may be substituted or unsubstituted, in the 3-position, and having a di-alkyl, halogen substituted dialkyl, or a spiro group which may be carbocyclic or heterocyclic, in the 2-position.

---

This application is a continuation-in-part of my copending application Ser. No. 517,995, filed Jan. 3, 1966, now Pat. 3,360,518, which patent in column 7, lines 40 and 41 discloses compounds within the generic structural formula of this application.

The invention relates to tetrahydro halosulfamyl quinazolinones having diuretic properties with low potassium excretion. More particularly the invention relates to compounds of the group consisting of (A) compounds of the formula:

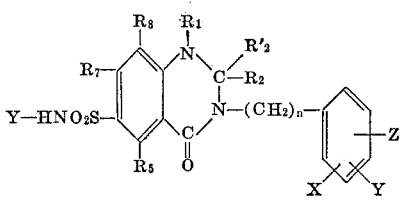

in which $R_1$ is hydrogen, loweralkyl, loweralkoxyloweralkyl, phenylloweralkyl or phenylloweralkyl substituted with a loweralkyl or a halogen attached to the phenyl moiety; $R'_2$ is loweralkyl, loweralkyl having a halogen attached to the alkyl group, such as chloromethyl, dichloromethyl, trifluoromethyl; loweralkoxy, loweralkoxyloweralkyl, loweralkylthioloweralkyl, benzylthioloweralkyl, phenyl or phenylloweralkyl which can be substituted or unsubstituted with a loweralkyl or a halogen such as chlorine, fluorine or iodine attached to the phenyl moiety; $R_2$ is one of the group of $R'_2$ or $R'_2$ and $R_2$ together with the 2-carbon atom form a carbocyclic or heterocyclic group, preferably having 3–10 carbon atoms; $x$ is hydrogen, loweralkyl, halogen, hydroxy, alkoxy, trifluoromethyl, amino, nitro or sulfamyl; $y$ and $z$ are any of $x$ or lowercycloalkyl such as cyclohexyl, cyclopentyl; or pyridyl unsubstituted or substituted by a radical as one of $x$; Y is hydrogen, loweralkyl, phenyl, phenylloweralkyl; $R_5$, $R_7$, and $R_8$ are hydrogen, halogen, halomethyl, loweralkyl, cyano, mercapto, loweralkylthio, nitro, amino, loweralkylamino, and loweralkoxy; $n$ is an integer from 0–4; and (B) pharmaceutically acceptable salts of (A).

Loweralkyl has from 1–8 carbon atoms in a straight chain, and lowercycloalkyl has from 3–8 carbon atoms in the ring.

Representative compounds, inter alia, of the above class are 7'-chloro-6'-sulfamyl-3'-(o-tolyl)-spiro [cyclohexane-1,2'(1'H) quinazoline]-4'(3'H)-one, 7'-chloro-1'-methyl-6' - sulfamyl - 3' - (o-tolyl)-spiro[piperidine-4,2'-(1'H)-quinazoline] - 4'(3'H) one, and 2,2 - dimethyl-3-o-tolyl-6 - sulfamyl - 7 - chloro-1,2,3,4-tetrahydro-4-quinazoline.

The above spiro compounds are made by reacting the N - o - tolyl - 2 - amino - 4 - chloro - 5 - sulfamyl benzamide with cyclohexanone for the first compound and 1-methyl-4-piperidone for the second compound. The above dimethyl compound is made by reacting N-o-tolyl-2-amino-4-chloro-5-sulfamyl benzamide with acetone in the presence of paratoluene sulfonic acid as a catalyst.

Other representative compounds which may be made by the general methods described above are:

7'-chloro-2-methyl-6'-sulfamyl-3'-o-tolylspiro[cyclohexane-1,2'(1'H)-quinazoline]-4'(3'H)-one
4,7'-dichloro-6'-sulfamyl-3'-o-tolylspiro[cyclohexane-1,2'(1'H)-quinazoline]-4'-(3'H)-one
7'-chloro-1-methyl-6'-sulfamyl-3-o-tolylspiro[pyrrolidine-2,2'(1'H)-quinazoline]-4'(3'H)-one
2,2-dimethyl-3-o-tolyl-6-sulfamyl-7-trifluoromethyl-1,2,3,4-tetrahydro-4-quinazoline
2-ethyl-2-methyl-3-o-tolyl-6-sulfamyl-7-chloro-1,2,3,4-tetrahydro-4-quinazoline
2-ethyl-2-methyl-3-o-tolyl-6-sulfamyl-7-trifluoromethyl-1,2,3,4-tetrahydro-4-quinazoline
2-chloromethyl-2-methyl-3-o-tolyl-6-sulfamyl-7-trifluoromethyl-1,2,3,4-tetrahydro-4-quinazoline
3'-benzyl-7'-chloro-1-methyl-6'-sulfamylspiro[piperidine-4,2'(1'H)-quinazoline]-4'(3'H)-one
7'-chloro-3'-phenethyl-6'-sulfamylspiro[cyclopentane-1,2'(1'H)-quinazoline]4'-(3'H)-one
3'-benzyl-1-methyl-6'-sulfamyl-7'-trifluoromethylspiro [piperidine-4,2'(1'H)-quinazoline]-4'(3'H)-one
3'-benzyl-7'-chloro-6'-sulfamylspiro[cyclopentane-1,2'(1'H)-quinazoline]-4'(3'H)-one
3'-benzyl-7'-chloro-6'-sulfamylspiro[cyclohexane-1,2' (1'H)-quinazoline]-4'(3'H)-one
3'-benzyl-7'-chloro-6'-sulfamylspiro[piperidine-4,2' (1'H)-quinazoline]-4'-(3'H)-one
2,2-dimethyl-3-phenyl-6-sulfamyl-7-chloro-1,2,3,4-tetrahydro-4-quinazolinone
2-chloromethyl-2-methyl-3-p-tolyl-6-sulfamyl-7-chloro-1,2,3,4-tetrahydro-4-quinazolinone
2-ethyl-2-methyl-3-m-tolyl-6-sulfamyl-7-chloro-1,2,3,4-tetrahydro-4-quinazolinone
3'-phenyl-6'-sulfamyl-7'-trifluoromethylspiro[cyclopentane-1,2'(1'H)-quinazoline]-4'(3'H)-one
6'-sulfamyl-3'-p-tolyl-7'-trifluoromethylspiro[cyclopentane-1,2'(1'H)-quinazoline]-4'(3'H)-one
7'-chloro-6'-sulfamyl-3-m-tolylspiro[cyclopentane-1,2' (1'H)-quinazoline]-4'(3'H)-one
7'-chloro-1-methyl-6'-sulfamyl-3'-p-tolylspiro[piperidine-4,2'(1'H)-quinazoline]-4'(3'H)-one
7'-chloro-6'-sulfamyl-3-p-tolylspiro[cyclohexane-1,2' (1'H)-quinazoline]-4'(3'H)-one 7'-chloro-3'-phenyl-6'-sulfamylspiro[cyclopentane-1,2'(1'H)-quinazoline]-4'(3'H)-one
7'-chloro-1-methyl-3'-phenyl-6'-sulfamylspiro[piperidine-4,2'(1'H)-quinazoline]-4'(3'H)-one
7'-chloro-1',1-dimethyl-6'-sulfamyl-3'-o-tolylspiro[piperidine-4,2'(1'H)-quinazoline]-4'(3'H)-one The following is a table of suitable compounds:
Me = methyl
Ph = phenyl
Et = ethyl
Pr = propyl

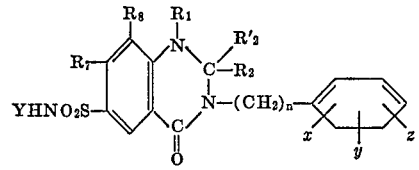

TABLE I

| $R_1$ | $R_2$ | $R'_2$ | $n$ | $x$ | $y$ | $z$ | $Y$ | $R_7$ | $R_8$ |
|---|---|---|---|---|---|---|---|---|---|
| H | Me | Me | 0 | o-Me | H | H | H | Cl | H |
| Me | Me | Me | 0 | o-Me | H | H | H | Cl | H |
| Et | Me | Me | 0 | o-Me | H | H | H | Cl | H |
| PhCH$_2$ | Me | Me | 0 | o-Me | H | H | H | Cl | H |
| (4-Cl-benzyl) | Me | Me | 0 | o-Me | H | H | H | Cl | H |
| (4-Cl-phenyl)-CH$_2$ | Me | Me | 0 | o-Me | H | H | H | Cl | H |
| (3-Cl-benzyl) | Me | Me | 0 | o-Me | H | H | H | Cl | H |
| PhCH$_2$CH$_2$ | Me | Me | 0 | o-Me | H | H | H | Cl | H |
| Cl-C$_6$H$_4$-CH$_2$CH$_2$ | Me | Me | 0 | o-Me | H | H | H | Cl | H |
| H | —(CH$_2$)$_5$— | | 0 | o-Me | H | H | H | Cl | H |
| Me | —(CH$_2$)$_5$— | | 0 | o-Me | H | H | H | Cl | H |
| Et | —(CH$_2$)$_5$— | | 0 | o-Me | H | H | H | Cl | H |
| PhCH$_2$ | —(CH$_2$)$_5$— | | 0 | o-Me | H | H | H | Cl | H |
| (4-Cl-benzyl) | —(CH$_2$)$_5$— | | 0 | o-Me | H | H | H | Cl | H |
| (4-Cl-phenyl)-CH$_2$ | —(CH$_2$)$_5$— | | 0 | o-Me | H | H | H | Cl | H |
| (3-Cl-benzyl) | —(CH$_2$)$_5$— | | 0 | o-Me | H | H | H | Cl | H |
| PhCH$_2$CH$_2$ | —(CH$_2$)$_5$— | | 0 | o-Me | H | H | H | Cl | H |
| Cl-C$_6$H$_4$-CH$_2$CH$_2$ | —(CH$_2$)$_5$— | | 0 | o-Me | H | H | H | Cl | H |
| H | | | 0 | o-Me | H | H | H | Cl | H |
| Me | | | 0 | o-Me | H | H | H | Cl | H |
| Et | | | 0 | o-Me | H | H | H | Cl | H |
| PhCH$_2$ | | | 0 | o-Me | H | H | H | Cl | H |
| (3-Cl-benzyl) | —CH$_2$N(CH$_3$)—CH$_2$CH$_2$CH$_2$— | | 0 | o-Me | H | H | H | Cl | H |
| (4-Cl-benzyl) | | | 0 | o-Me | H | H | H | Cl | H |
| (3-Cl-benzyl) | | | 0 | o-Me | H | H | H | Cl | H |
| PhCH$_2$CH$_2$ | | | 0 | o-Me | H | H | H | Cl | H |
| Cl-C$_6$H$_4$-CH$_2$CH$_2$ | | | 0 | o-Me | H | H | H | Cl | H |
| H | Me | Me | 0 | o-Me | H | H | H | Cl | H |
| H | Et | Et | 0 | o-Me | H | H | H | Cl | H |
| H | Pr | Pr | 0 | o-Me | H | H | H | Cl | H |
| H | ClCH$_2$ | ClCH$_2$ | 0 | o-Me | H | H | H | Cl | H |
| H | Cl$_2$CH | Cl$_2$CH | 0 | o-Me | H | H | H | Cl | H |

TABLE I.—Continued

| R₁ | R₂ | R'₂ | n | x | y | z | Y | R₇ | R₈ |
|---|---|---|---|---|---|---|---|---|---|
| H | CF₃ | CF₃ | 0 | o-Me | H | H | H | Cl | H |
| H | Ph | Ph | 0 | o-Me | H | H | H | Cl | H |
| H | PhCH₂ | PhCH₂ | 0 | o-Me | H | H | H | Cl | H |
| H | PhCH₂CH₂ | PhCH₂CH₂ | 0 | o-Me | H | H | H | Cl | H |
| H | Cl-C₆H₄-CH₂ | Cl-C₆H₄-CH₂ | 0 | o-Me | H | H | H | Cl | H |
| H | (3-Cl)C₆H₄-CH₂ | (3-Cl)C₆H₄-CH₂ | 0 | o-Me | H | H | H | Cl | H |
| H | (4-Cl)C₆H₄-CH₂ | (4-Cl)C₆H₄-CH₂ | 0 | o-Me | H | H | H | Cl | H |
| H | (F)C₆H₄-CH₂ | (F)C₆H₄-CH₂ | 0 | o-Me | H | H | H | Cl | H |
| H | I-C₆H₄-CH₂ | I-C₆H₄-CH₂ | 0 | o-Me | H | H | H | Cl | H |
| H | cyclopentyl | cyclopentyl | 0 | o-Me | H | H | H | Cl | H |
| H | Ph-cyclohexyl | Ph-cyclohexyl | 0 | o-Me | H | H | H | Cl | H |
| H | —CHPh₂ | —CHPh₂ | 0 | o-Me | H | H | H | Cl | H |
| H | Me | Et | 0 | o-Me | H | H | H | Cl | H |
| H | Me | Pr | 0 | o-Me | H | H | H | Cl | H |
| Me | Me | Me | 0 | o-Me | H | H | H | Cl | H |
| H | Me | ClCH₂ | 0 | o-Me | H | H | H | Cl | H |
| H | Me | CF₃ | 0 | o-Me | H | H | H | Cl | H |
| H | Me | Ph | 0 | o-Me | H | H | H | Cl | H |
| H | Me | PhCH₂ | 0 | o-Me | H | H | H | Cl | H |
| H | Me | cyclopentyl | 0 | o-Me | H | H | H | Cl | H |
| H | Me | cyclohexyl | 0 | o-Me | H | H | H | Cl | H |
| H | —(CH₂)₃— | | 0 | o-Me | H | H | H | Cl | H |
| H | —(CH₂)₄— | | 0 | o-Me | H | H | H | Cl | H |
| H | —(CH₂)₆— | | 0 | o-Me | H | H | H | Cl | H |
| H | —(CH₂)₇— | | 0 | o-Me | H | H | H | Cl | H |
| H | —(CH₂)₈— | | 0 | o-Me | H | H | H | Cl | H |
| H | —(CH₂)₉— | | 0 | o-Me | H | H | H | Cl | H |
| H | —CH₂—CH(Cl)—CH₂—CH₂— | | 0 | o-Me | H | H | H | Cl | H |
| H | —CH₂—CH(CH₃)—(CH₂)₃— | | 0 | o-Me | H | H | H | Cl | H |
| H | —CH₂CH₂N(Me)CH₂CH₂— | | 0 | o-Me | H | H | H | Cl | H |
| H | —CH₂NHCH₂CH₂— | | 0 | o-Me | H | H | H | Cl | H |
| H | —CH₂N(CH₃)CH₂CH₂— | | 0 | o-Me | H | H | H | Cl | H |
| H | —CH₂NH(CH₂)₃— | | 0 | o-Me | H | H | H | Cl | H |
| H | —CH₂N(Ph)(CH₂)₃— | | 0 | o-Me | H | H | H | Cl | H |
| H | —CH₂N(Me)(CH₂)₃— | | 0 | o-Me | H | H | H | Cl | H |
| H | —CH₂NH(CH₂)₄— | | 0 | o-Me | H | H | H | Cl | H |
| H | —CH₂N(Ph)(CH₂)₄— | | 0 | o-Me | H | H | H | Cl | H |
| H | —CH₂N(Me)(CH₂)₄— | | 0 | o-Me | H | H | H | Cl | H |
| H | —NHCH₂CH₂NHCH₂— | | 0 | o-Me | H | H | H | Cl | H |
| H | —NHCH₂CH₂CH₂NCH₂— (Me) | | 0 | o-Me | H | H | H | Cl | H |
| H | —NHCH₂CH₂CH₂N(Ph)—CH₂— | | 0 | o-Me | H | H | H | Cl | H |
| H | Me | Me | 1 | o-Me | H | H | H | Cl | H |
| H | Me | Me | 2 | o-Me | H | H | H | Cl | H |
| H | Me | Me | 3 | o-Me | H | H | H | Cl | H |
| H | Me | Me | 4 | o-Me | H | H | H | Cl | H |
| H | —(CH₂)₅— | | 1 | o-Me | H | H | H | Cl | H |
| H | —(CH₂)₅— | | 2 | o-Me | H | H | H | Cl | H |
| H | —(CH₂)₅— | | 3 | o-Me | H | H | H | Cl | H |

TABLE I.—Continued

| R₁ | R₂ | R′₂ | n | x | y | z | Y | R₇ | R₈ |
|---|---|---|---|---|---|---|---|---|---|
| H | | —(CH₂)₅— | 4 | o-Me | H | H | H | Cl | H |
| H | | —CH₂N(CH₂)₂—<br>    \|<br>    CH₃ | 1 | o-Me | H | H | H | Cl | H |
| H | | —CH₂N(CH₂)₂—<br>    \|<br>    CH₃ | 2 | o-Me | H | H | H | Cl | H |
| H | | —CH₂N(CH₂)₂<br>    \|<br>    CH₃ | 3 | o-Me | H | H | H | Cl | H |
| H | | —CH₂N(CH₂)₂—<br>    \|<br>    CH₃ | 4 | o-Me | H | H | H | Cl | H |
| H | Me | Me | 0 | o-Et | H | H | H | Cl | H |
| H | Me | Me | 0 | o-Cl | H | H | H | Cl | H |
| H | Me | Me | 0 | m-Cl | H | H | H | Cl | H |
| H | Me | Me | 0 | p-Cl | H | H | H | Cl | H |
| H | Me | Me | 0 | o-Br | H | H | H | Cl | H |
| H | Me | Me | 0 | m-F | H | H | H | Cl | H |
| H | Me | Me | 0 | p-OH | H | H | H | Cl | H |
| H | Me | Me | 0 | p-OMe | H | H | H | Cl | H |
| H | Me | Me | 0 | o-OEt | H | H | H | Cl | H |
| H | Me | Me | 0 | m-CF₃ | H | H | H | Cl | H |
| H | Me | Me | 0 | p-NH₂ | H | H | H | Cl | H |
| H | Me | Me | 0 | p-NO₂ | H | H | H | Cl | H |
| H | Me | Me | 0 | o-SO₂NH₂ | H | H | H | Cl | H |
| H | | —(CH₂)₅— | 0 | o-Et | H | H | H | Cl | H |
| H | | —(CH₂)₅— | 0 | o-Cl | H | H | H | Cl | H |
| H | | —(CH₂)₅— | 0 | m-Cl | H | H | H | Cl | H |
| H | | —(CH₂)₅— | 0 | p-Cl | H | H | H | Cl | H |
| H | | —(CH₂)₅— | 0 | o-Br | H | H | H | Cl | H |
| H | | —(CH₂)₅— | 0 | m-F | H | H | H | Cl | H |
| H | | —(CH₂)₅— | 0 | p-OH | H | H | H | Cl | H |
| H | | —(CH₂)₅— | 0 | p-OMe | H | H | H | Cl | H |
| H | | —(CH₂)₅— | 0 | o-OEt | H | H | H | Cl | H |
| H | | —(CH₂)₅— | 0 | m-CF₃ | H | H | H | Cl | H |
| H | | —(CH₂)₅— | 0 | p-NH₂ | H | H | H | Cl | H |
| H | | —(CH₂)₅— | 0 | p-NO₂ | H | H | H | Cl | H |
| H | | —(CH₂)₅— | 0 | o-SO₂NH₂ | H | H | H | Cl | H |
| H | Me | Me | 0 | 2-Me | 3-Me | H | H | Cl | H |
| H | Me | Me | 0 | 2-Me | 4-Et | H | H | Cl | H |
| H | Me | Me | 0 | 2-Me | 5-Cl | H | H | Cl | H |
| H | Me | Me | 0 | 2-Me | 6-Br | H | H | Cl | H |
| H | Me | Me | 0 | 2-Me | 3-F | H | H | Cl | H |
| H | Me | Me | 0 | 2-Me | 4-OH | H | H | Cl | H |
| H | Me | Me | 0 | 2-Me | 4-OMe | H | H | Cl | H |
| H | Me | Me | 0 | 2-Me | 5-CF₃ | H | H | Cl | H |
| H | Me | Me | 0 | 2-Me | 6-NH₂ | H | H | Cl | H |
| H | Me | Me | 0 | 2-Me | 3-SO₂NH₂ | H | H | Cl | H |
| H | | —(CH₂)₅— | 0 | 2-Me | 3-Me | 4-Me | H | Cl | H |
| H | | —(CH₂)₅— | 0 | 2-Me | 3-Me | 5-Et | H | Cl | H |
| H | | —(CH₂)₅— | 0 | 2-Me | 3-Me | 6-Cl | H | Cl | H |
| H | | —(CH₂)₅— | 0 | 2-Me | 3-Me | 4-Br | H | Cl | H |
| H | | —(CH₂)₅— | 0 | 2-Me | 3-Me | 4-F | H | Cl | H |
| H | | —(CH₂)₅— | 0 | 2-Me | 3-Me | 4-OH | H | Cl | H |
| H | | —(CH₂)₅— | 0 | 2-Me | 3-Me | 4-OMe | H | Cl | H |
| H | | —(CH₂)₅— | 0 | 2-Me | 3-Me | 4-CF₃ | H | Cl | H |
| H | | —(CH₂)₅— | 0 | 2-Me | 3-Me | 4-NH₂ | H | Cl | H |
| H | | —(CH₂)₅— | 0 | 2-Me | 3-Me | 4-NO₂ | H | Cl | H |
| H | | —(CH₂)₅— | 0 | 2-Me | 3-Me | 4-SO₂NH₂ | H | Cl | H |
| H | | —(CH₂)₅— | 0 | 2-Me | H | H | Me | Cl | H |
| H | | —(CH₂)₅— | 0 | 2-Me | H | H | Ph | Cl | H |
| H | | —(CH₂)₅— | 0 | 2-Me | H | H | PhCH₂ | Cl | H |
| H | | —(CH₂)₅— | 0 | 2-Me | H | H | H | H | H |
| H | | —(CH₂)₅— | 0 | 2-Me | H | H | H | F | H |
| H | | —(CH₂)₅— | 0 | 2-Me | H | H | H | Br | H |
| H | | —(CH₂)₅— | 0 | 2-Me | H | H | H | CH₂Cl | H |
| H | | —(CH₂)₅— | 0 | 2-Me | H | H | H | CF₃ | H |
| H | | —(CH₂)₅— | 0 | 2-Me | H | H | H | Me | H |
| H | | —(CH₂)₅— | 0 | 2-Me | H | H | H | Et | H |
| H | | —(CH₂)₅— | 0 | 2-Me | H | H | H | OMe | H |

The following examples are given to illustrate the invention:

EXAMPLE I

7′-chloro-6′-sulfamyl-3′-(o-tolyl)-spiro[cyclohexane-1,2′(1′H)-quinazoline]-4′(3′H)-one

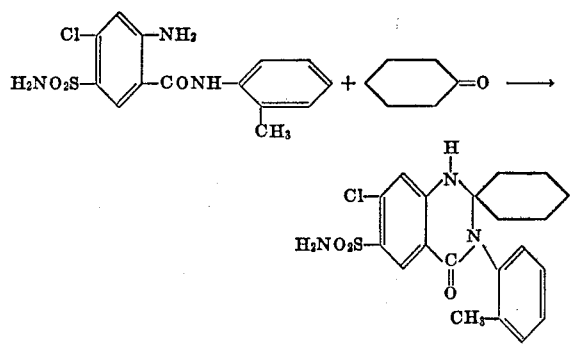

2 - amino - 4-chloro-5-sulfamyl-N-(o-tolyl)-benzamide (20 mg.) was slurried in 200 ml. acetic acid. To the slurry was added 7.5 gm. of cyclohexanone and 6 drops of concentrated sulfuric acid. The mixture was stirred for 5 hours, filtered, washed with ether and dried. The crude product weighed 25 gm. and melted at 279–282°. The product was purified by dissolving in 70 ml. dimethylformamide, heating to 100° and adding 35 ml. of 100° water. After cooling the product was filtered, washed twice with 25 ml. of 3:2:DMF:H₂O, then with 3× 50 ml. methanol and finally with 3× 100 ml. ether. After drying in vacuo over phosphorus pentoxide the product weighed 20.5 gm. and melted at 291–293°.

*Analysis.*—Calc. for $C_{20}H_{22}ClN_3O_3$ (percent) M.W. 419.93: C, 57.20; H, 5.28; N, 10.01; Cl, 8.44; C, 7.64. Found: C, 57.36; H, 5.35; N, 10.14; Cl, 8.39; S, 7.84.

EXAMPLE 2

7'-chloro-6'-sulfamyl-3'-o-tolyl-spiro[cyclopentane-
1,2'(1'H)-quinazolin]-4'(3'H)-one

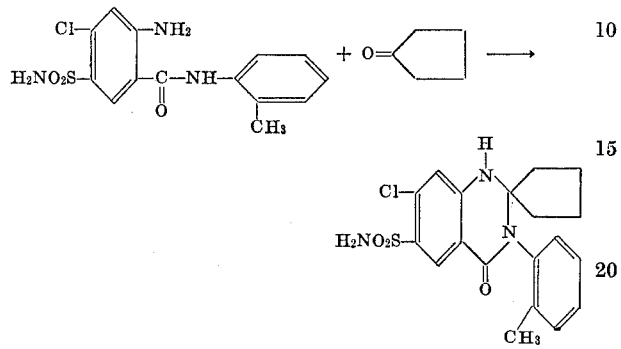

To a mixture of 17 gm. (0.05 mole) of N-o-tolyl-2-amino-4-chloro-5-sulfamylbenzamide, 175 ml. glacial acetic acid and 10 ml. cyclopentanone was added 25 drops of conc. sulfuric acid. The mixture was stirred at room temperature. After 2 hours another 10 ml. of cyclopentanone was added. The mixture was stirred an additional 4 hours and another 10 ml. of cyclopentanone was added. After stirring the reaction mixture an additional 15 hours, the solid was filtered washed with glacial acetic acid and air dried. Yield 16.4 gm., M.P. 265–268°. After two recrystallizations from 95% ethanol the colorless crystalline solid melted at 268–270.5°.

Calc. for $C_{19}H_{20}ClN_3O_3S$ (percent): C, 56.22; H, 4.97; N, 10.35; Cl, 8.73; S, 7.90. Found (percent): C, 56.38; H, 5.04; N, 10.35; Cl, 8.44; S, 8.06.

EXAMPLE 3

7'-chloro-1'-methyl-6'-sulfamyl-3'-o-tolyl-spiro
[piperidine-4,2'(1'H)-quinazolin]-4'(3'H)-one

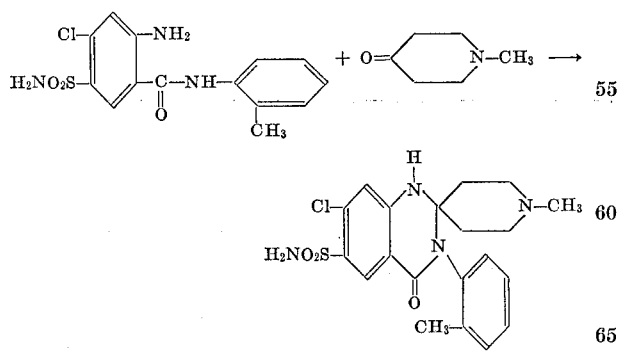

To a mixture of 67.9 gm. (0.2 mole) of N-o-tolyl-2-amino-4-chloro-5-sulfamylbenzamide, 900 ml. glacial acetic acid and 30 gm. (0.265 mole) of 1-methyl-4-piperidone was added dropwise 20 ml. conc. sulfuric acid. The mixture was stirred vigorously at room temperature for 24 hours. The glacial acetic acid was decanted from the oil and discarded. The oil was dissolved in 1 liter of water and after 1½ hours the mixture filtered and the solid discarded. The filtrate was treated with a saturated solution of sodium carbonate until a pH of 8 was reached. Water was added as needed to maintain mobility. Total volume of mixture was 3.5 liters. The solid was filtered, washed with water and air dried. After three recrystallizations from 95% ethanol obtained 60.0 gm. of solvated colorless crystals. Drying product at 131° in vacuo for 18 hours yielded a dry product m.p. 219–222.5° (dec.).

Calc. for $C_{20}H_{23}ClN_4O_3S$ (percent): C, 55.23; H, 5.33; N, 12.88; Cl, 8.15; S, 7.37. Found (percent): C, 55.11; H, 5.37; N, 12.91; Cl, 8.28; S, 7.35, 7.23.

EXAMPLE 4

2,2 dimethyl-3-o-tolyl-6-sulfamyl=7 chloro-1,2,3,4-tetrahydro-4-quinazolinone

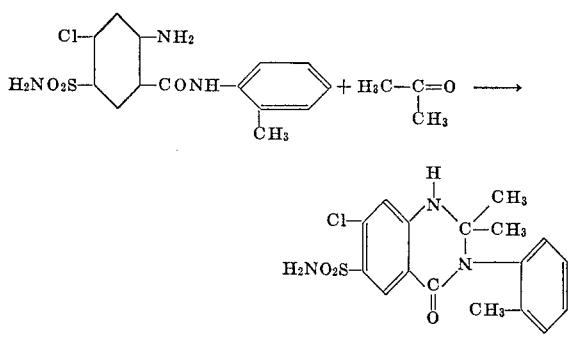

N-o-tolyl-2-amino-4-chloro-5-sulfamylbenzamide (18 gm., .053 M) was suspended in a solution of acetone (20 ml.) and acetic acid (100 ml.) at room temperature. p-toluenesulfonic acid (0.2 gm.) was added and the reaction was stirred for two hours. The insoluble solids were filtered and washed with acetic acid and diethyl ether. M.P. 259–262° C., wt.=20 gm. The product was recrystallized from 95% ethanol to give the title compound, M.P. 267–272°, wt.=12 gm.

*Analysis.*—Calc. for $C_{17}H_{18}ClN_3O_3S$ (percent): C, 53.76; H, 4.77; N, 11.07; Cl, 9.33; S, 8.44. Found (percent): C, 53.87; H, 4.85; N, 11.04; Cl, 9.32; S, 8.61.

Pharmaceutically acceptable salts of the compounds of group A of the generic formula may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

The following Table I is a summary of pharmacology tests run on representative compounds of this invention. From such tests and other indications and analogy applicant states that all compounds of the generic class first above written are effective diuretics and saluretics with low toxicity. All of the compounds also have low potassium excretion and several, as indicated, actually have a negative effect on potassium excretion, i.e., a lower potassium excretion than the control.

TABLE I

| Structure and name | Quantity | No. of rats | Dose, mg./kg. | Percent=(Compound Response-Control)×100 / Control | | | | Ratio of Na+/K+ Output | |
|---|---|---|---|---|---|---|---|---|---|
| | | | | Volume | Na+ | K+ | Cl- | Control | Compound |
| 7'-chloro-6'-sulfamyl-3'-(o-tolyl)-spiro (cyclopentane-1,2'-(1'H)-quinazolin)-4' (3'H)-one | 11.2 bms | 4 | 1 | −10.20 | −38.80 | +5.50 | +31.60 | 3.56 | 2.07 |
| | | 4 | 10 | −3.60 | +6.10 | +5.50 | +1.40 | 3.56 | 3.59 |
| | | 4 | 100 | +14.50 | 0.00 | +14.50 | −5.70 | 3.56 | 3.11 |
| | | 4 | 1 | −2.10 | −12.60 | −24.60 | −17.40 | 3.69 | 4.45 |
| | | 4 | 10 | +7.90 | +21.00 | +15.50 | +27.10 | 3.69 | 3.86 |
| | | 4 | 100 | +57.10 | +79.00 | +43.10 | +72.00 | 3.69 | 4.66 |
| 7'-chloro-6'-sulfamyl-3'-(o-tolyl)-spiro (cyclohexane-1,2'-(1'H)-quinazolin)-4' (3'H)-one | 19.0 gms | 4 | 1 | +7.20 | +7.10 | −10.90 | +11.80 | 3.56 | 4.29 |
| | | 4 | 10 | +7.80 | +6.10 | −9.10 | −10.80 | 3.56 | 4.16 |
| | | 4 | 100 | +26.50 | +38.30 | +29.10 | +40.60 | 3.56 | 3.82 |
| | | 4 | 1 | +0.50 | −12.10 | −8.60 | −10.10 | 3.69 | 3.55 |
| | | 4 | 10 | +1.10 | −21.50 | +19.00 | −8.70 | 3.69 | 2.43 |
| | | 4 | 100 | −7.40 | −37.90 | +1.70 | −33.00 | 3.69 | 2.25 |
| 2,2-dimethyl-3-o-tolyl-6-sulfamyl-7-chloro-1,2,3,4-tetrahydroquinazolinone | 10.6 gms | 4 | 1 | +36.70 | +40.30 | +85.50 | +47.60 | 3.56 | 2.70 |
| | | 4 | 10 | +9.00 | +15.80 | +38.20 | +24.10 | 3.56 | 2.99 |
| | | 4 | 100 | +59.00 | +62.80 | +52.70 | +89.60 | 3.56 | 3.80 |
| | | 4 | 1 | −13.20 | −1.90 | −15.50 | −3.70 | 3.69 | 4.29 |
| | | 4 | 10 | +51.90 | +96.70 | +265.50 | +106.90 | 3.69 | 1.99 |
| | | 4 | 100 | +7.90 | +15.40 | +12.10 | +17.40 | 36.69 | 3.80 |
| 7'-chloro-1-methyl-6'-sulfamyl-3'-(o-tolyl)-spiro (piperidine-4,2' (1'H)-quinazolin)-4' (3'H)-one | 20.7 gms | 8 | 1.0 | −8.80 | +0.46 | −20.80 | −2.30 | 4.55 | 5.77 |
| | | 8 | 10.0 | +9.98 | +7.28 | +11.90 | +10.00 | 4.55 | 4.56 |
| | | 8 | 100.0 | +10.80 | +6.20 | +4.40 | +1.10 | 4.55 | 4.36 |
| | | 8 | 1.0 | +41.20 | +27.20 | +40.30 | +37.40 | 3.32 | 3.01 |
| | | 8 | 10.0 | +29.70 | −3.89 | −9.67 | +11.10 | 3.32 | 3.54 |
| | | 8 | 100.0 | +26.10 | +12.60 | +19.30 | +30.80 | 3.32 | 3.14 |

I claim:
1. A compound of the formula:

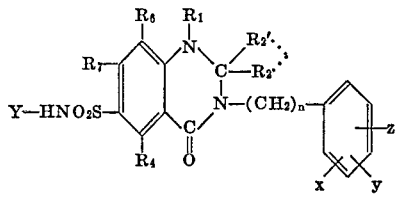

or pharmaceutically acceptable salts thereof, in which $R_1$ is hydrogen, loweralkyl, loweralkoxy, loweralkoxyloweralkyl, phenylloweralkyl or phenylloweralkyl substituted with a halogen attached to the phenyl moiety; $R'_2$ and $R_2$ together with the nuclear carbon atom to which they are attached form a cycloalkyl group containing 3–10 carbon atoms unsubstituted or substituted with chloro; or a nitrogen-containing heterocyclic group consisting of 3–10 methylene groups and not more than two NH groups unsubstituted or substituted with methyl or phenyl; $x$ is hydrogen, loweralkyl, halogen, hydroxy, loweralkoxy, trifluoromethyl, amino, nitro or sulfamyl; $y$ and $z$ are any of $x$ or lowercycloalkyl, or pyridyl unsubstituted or substituted by one of $x$; Y is hydrogen, loweralkyl, phenyl, phenylloweralkyl; $R_5$, $R_7$ and $R_8$ are hydrogen, halogen, halomethyl, loweralkyl, cyano, mercapto, loweralkylthio, nitro, amino, loweralkylamino, or loweralkoxy; $n$ is an integer from 0–4.

2. The compound of claim 1 wherein the recited groups of the formula are such that the compound is 7' - chloro - 6'-sulfamyl-3'-(o-tolyl)-spiro[cyclohexane-1,2'(1'H) quinazoline]-4'(3H)-one 3. The compound of claim 1 wherein the recited groups of the formula are such that the compound is 7'-chloro-6' - sulfamyl - 3'-(o-tolyl)-spiro[cyclopentane-1,2'(1'H)-quinazoline]-4'(3H)-one 4. The compound of claim 1 wherein the recited groups of the formula are such that the compound is 7'-chloro-1' - methyl - 6' - sulfamyl - 3'-(o-tolyl)-spiro[piperidine-4,2'(1H)-quinazoline]-4'(3'H) one

References Cited
FOREIGN PATENTS 926,038   5/1963   Great Britain.

OTHER REFERENCES

Chem. Abstracts, 63:13286d–e (1965).

ALEX MAZEL, Primary Examiner

R. J. GALLAGHER, Assistant Examiner

U.S. Cl. X.R.

424—251

UNITED STATES PATENT OFFICE
CERTIFICATE OF CORRECTION

Patent No. 3,518,392   Dated June 30, 1970

Inventor(s) BOLA VITHAL SHETTY

It is certified that error appears in the above-identified patent and that said Letters Patent are hereby corrected as shown below:

Column 2, lines 9, 11, 23, 25, 27, 37, 39, 41, 43, 45, 47, 55, 57, 59, 61 and 63, "quinazoline" should be --quinazolin--.

Column 2, lines 12, 29, 31, 33 and 35, "quinazoline" should be --quinazolinone--.

Column 7, line 61, "quinazoline" should be --quinazolin--.

Column 11, Claim 1, in the structural formula, "$R_4$" should be --$R_5$-- and "$R_6$" should be --$R_8$--.

Column 13, Claims 2, 3 and 4, last line of each claim, "quinazoline" should be --quinazolin--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents